(12) United States Patent
Moon et al.

(10) Patent No.: US 8,665,233 B2
(45) Date of Patent: Mar. 4, 2014

(54) INPUT DEVICE AND CONTROL METHOD THEREOF

(75) Inventors: Jong-bo Moon, Suwon-si (KR); Eun-seok Choi, Suwon-si (KR); Ho-june Yoo, Seoul (KR); Sang-on Choi, Suwon-si (KR); Chang-soo Noh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 13/052,487

(22) Filed: Mar. 21, 2011

(65) Prior Publication Data

US 2012/0019459 A1  Jan. 26, 2012

(30) Foreign Application Priority Data

Jul. 22, 2010 (KR) .......................... 10-2010-0071109

(51) Int. Cl.
*G06F 3/041* (2006.01)
(52) U.S. Cl.
USPC ........ 345/173; 345/174; 345/172; 178/18.01; 178/18.06; 463/37; 463/38
(58) Field of Classification Search
USPC ............ 345/173–178, 172; 178/18.01–18.09; 715/771–773; 463/37–38
See application file for complete search history.

(56) References Cited

U.S. PATENT DOCUMENTS

| | | | | |
|---|---|---|---|---|
| 2001/0024195 A1* | 9/2001 | Hayakawa | ............ | 345/173 |
| 2005/0030291 A1* | 2/2005 | Yanagisawa | ............ | 345/173 |
| 2005/0071778 A1* | 3/2005 | Tokkonen | ............ | 715/822 |
| 2005/0206730 A1* | 9/2005 | Hagiwara | ............ | 348/169 |
| 2008/0055259 A1* | 3/2008 | Plocher | ............ | 345/173 |
| 2008/0284756 A1* | 11/2008 | Hsu et al. | ............ | 345/178 |
| 2009/0241047 A1* | 9/2009 | Kuwahara et al. | ............ | 715/765 |
| 2009/0303187 A1* | 12/2009 | Pallakoff | ............ | 345/169 |
| 2010/0110012 A1* | 5/2010 | Maw | ............ | 345/169 |
| 2010/0134423 A1* | 6/2010 | Brisebois et al. | ............ | 345/173 |
| 2010/0321303 A1* | 12/2010 | Kwok et al. | ............ | 345/173 |

FOREIGN PATENT DOCUMENTS

JP  2008-242958 A  10/2008
KR  10-2008-0090003 A  10/2008

\* cited by examiner

*Primary Examiner* — Lun-Yi Lao
*Assistant Examiner* — Md Saiful A Siddiqui
(74) *Attorney, Agent, or Firm* — Sughrue Mion, PLLC

(57) ABSTRACT

A control method includes: receiving a user's input through a touch area of the input device; and recognizing the user's touch input to the touch area through a recognition area of the input device corresponding to the touch area and changing and assigning a range of the recognition area corresponding to the touch area according to a predetermined standard.

4 Claims, 12 Drawing Sheets

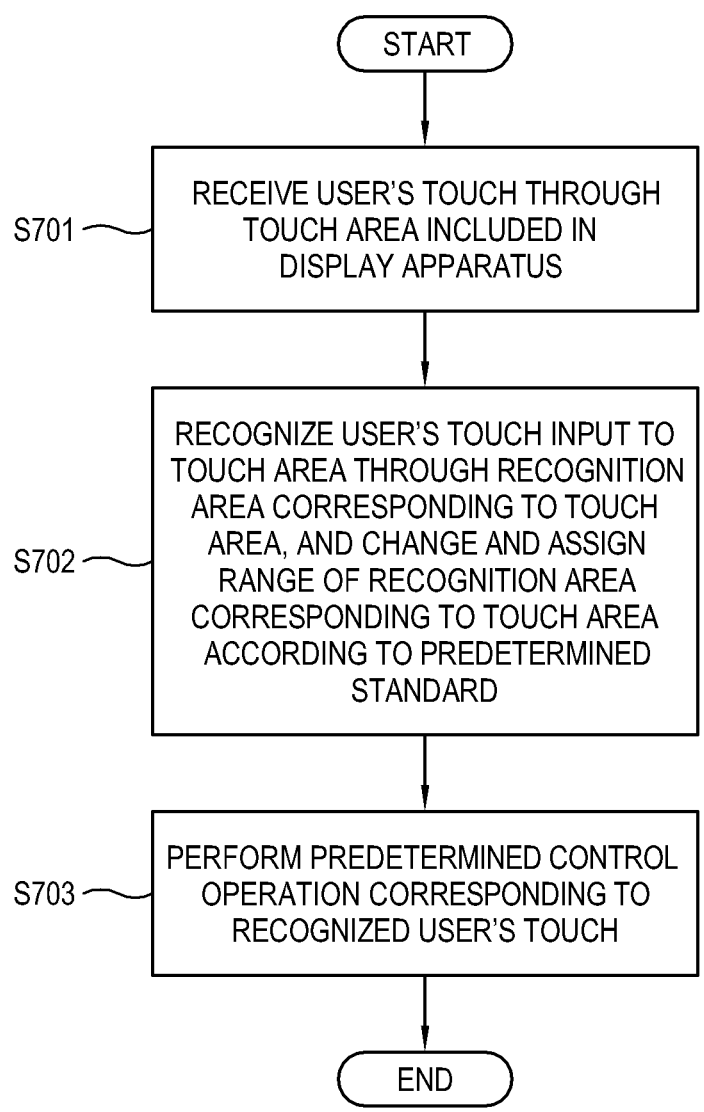

INPUT DEVICE AND CONTROL METHOD THEREOF

CROSS-REFERENCE TO RELATED APPLICATION

This application claims priority from Korean Patent Application No. 10-2010-0071109, filed on Jul. 22, 2010 in the Korean Intellectual Property Office, the disclosure of which is incorporated herein in its entirety by reference.

BACKGROUND

1. Field

Apparatuses and methods consistent with the exemplary embodiments relate to an input device and a control method thereof, and more particularly, to an input device and a control method thereof which dynamically reassigns a recognition area of a touch pad according to various standards to recognize a touch point meeting a user's intention.

2. Description of the Related Art

A TV remote controller or a mobile phone has a keypad that includes a plurality of buttons. Such buttons should be arranged for a user to properly manipulate a number of functions of the remote controller or the mobile phone.

In the case of a touch pad that extracts coordinates from a user's touch, errors may occur depending on a hand gripping the touch pad and a movement of a finger touching the touchpad since the coordinates are fixed without reflecting the gripping type, or a movement radius or type of a touching medium.

Accordingly, if the area of the touch pad is classified with the error and used as a button, an unintended button may be clicked and wrong coordinate values may be generated with respect to all movements on the touch pad.

SUMMARY

Accordingly, one or more exemplary embodiments provide an input device and a control method thereof which dynamically reassigns a recognition area of a touch pad depending on a size and a type of the touch pad, a contact location and area of a user's hand gripping the touch pad and reduces a difference between coordinates intended by a user and coordinates of the touch pad actually contacted by a user's finger to thereby prevent errors.

The foregoing and/or other aspects may be achieved by providing a control method of an input device, the control method including: receiving a user's input through a touch area of the input device; and recognizing the user's touch input to the touch area through a recognition area of the input device corresponding to the touch area and changing and assigning a range of the recognition area corresponding to the touch area according to a predetermined standard.

The changing the assigning the range of the recognition area may include dividing the recognition area into a plurality of cell areas and changing and assigning the range of the recognition area corresponding to the touch area by a cell coordinate system in which at least a part of the plurality of cell areas is nonuniformly divided.

The predetermined standard may include a location in the touch area.

The predetermined standard may include a type of the touch area.

The predetermined standard may include a touching pattern.

The predetermined standard may include a touching speed.

The predetermined standard may include a user's characteristic.

The predetermined standard may include a touching medium.

The control method may further include recognizing a cell area corresponding to the user's touch and transmitting a signal to a display apparatus based on the recognized cell area.

The foregoing and/or other aspects may be achieved by providing an input device including: a touch panel which includes a touch area to receive a user's touch and a recognition area to recognize the user's touch input to the touch area corresponding to the touch area; and a controller which changes and assigns a range of the recognition area corresponding to the touch area according to a predetermined standard.

The controller may divide the recognition area into a plurality of cell areas, and change and assign the range of the recognition area corresponding to the touch area by a cell coordinate system in which at least a part of the cell areas is nonuniformly divided.

The predetermined standard may include a location in the touch area.

The predetermined standard may include a type of the touch area.

The predetermined standard may include a touching pattern.

The predetermined standard may include a touching speed.

The predetermined standard may include a user's characteristic.

The predetermined standard may include a touching medium.

The input device may further include a communication unit which communicates with a display apparatus, and the controller may recognize a cell area corresponding to the user's touch and control the communication unit to transmit a signal to the display apparatus based on the recognized cell area.

The foregoing and/or other aspects may be achieved by providing a control method of a system which includes an input device and a display apparatus, the control method including: receiving a user's touch through a touch area of the input device; recognizing the user's touch input to the touch area through a recognition area of the input device corresponding to the touch area and changing and assigning a range of the recognition area corresponding to the touch area according to a predetermined standard; transmitting a control signal to the display apparatus by the input device based on the recognized user's touch; and controlling the displaying apparatus based on the control signal which is received from the input device.

The foregoing and/or other aspects may be achieved by providing a system which includes an input device and a display apparatus, the system including: an input device which includes a touch area to receive a user's touch and a recognition area to recognize the user's touch input to the touch area corresponding to the touch area, and changes and assigns a range of the recognition area corresponding to the touch area according to a predetermined standard, and transmits a control signal to the display apparatus based on the recognized user's touch; and display apparatus which performs a control operation based on the control signal which is received from the input device.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 7 is a flowchart of a control process of the display apparatus according to the exemplary embodiment.

DETAILED DESCRIPTION OF EXEMPLARY EMBODIMENTS

Figure 1:
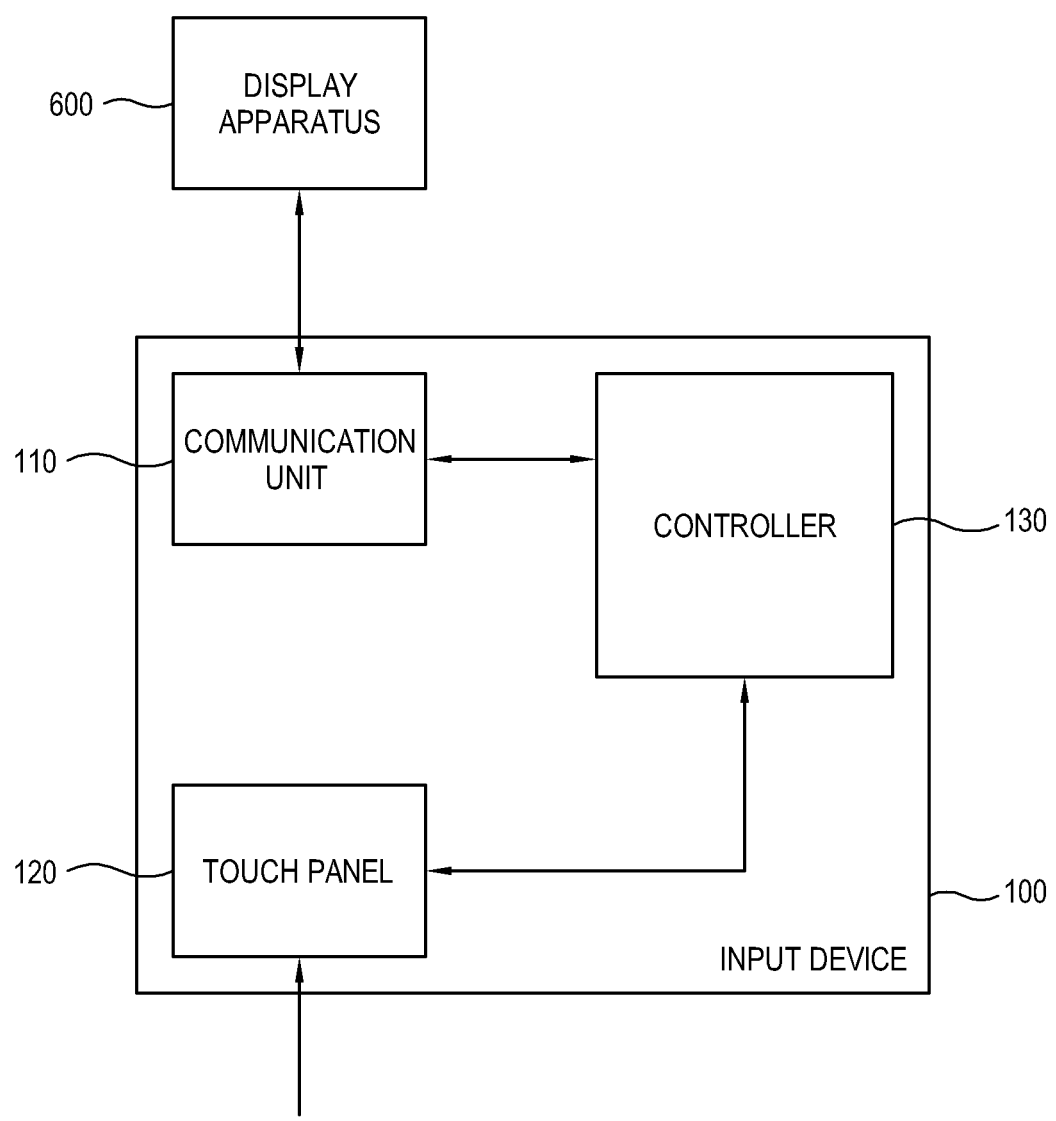
FIG. 1 is a block diagram of an input device according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an input device according to an exemplary embodiment.

An input device 100 according to the exemplary embodiment may include a remote controller, a keyboard or a mobile terminal. The input device 100 may further include any auxiliary device as long as it includes a plurality of keys and controls a display apparatus 600 corresponding to a user's input through the plurality of keys.

The input device 100 according to the exemplary embodiment may include a communication unit 110, a touch panel 120 and a controller 130.

The communication unit 110 may communicate with the display apparatus 600. A communication between the communication unit 110 and the display apparatus 600 may be performed by, for example, an infrared communication, Bluetooth, local area network (LAN), wireless LAN (WLAN), Zigbee, Wi-Fi and other various wired or wireless communications.

Figure 2A:
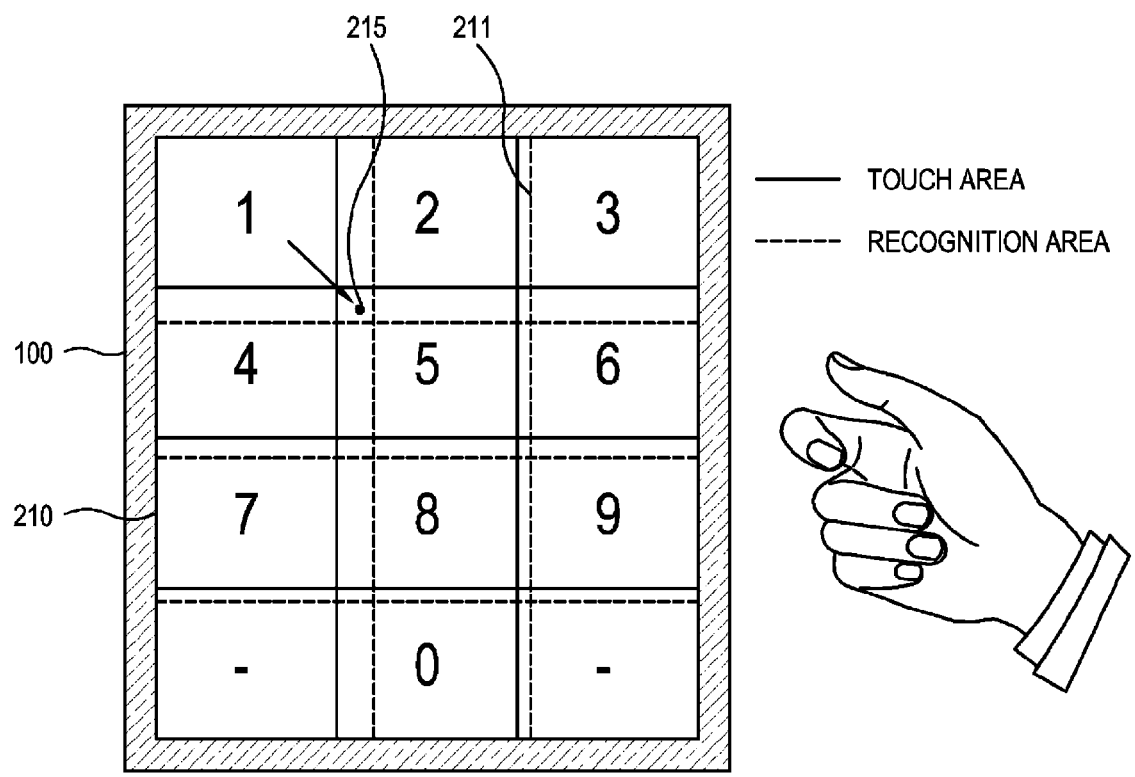
FIGS. 2A and 2B illustrate examples of a touch area and a recognition area that are dynamically assigned according to the exemplary embodiment.
Figure 2B:
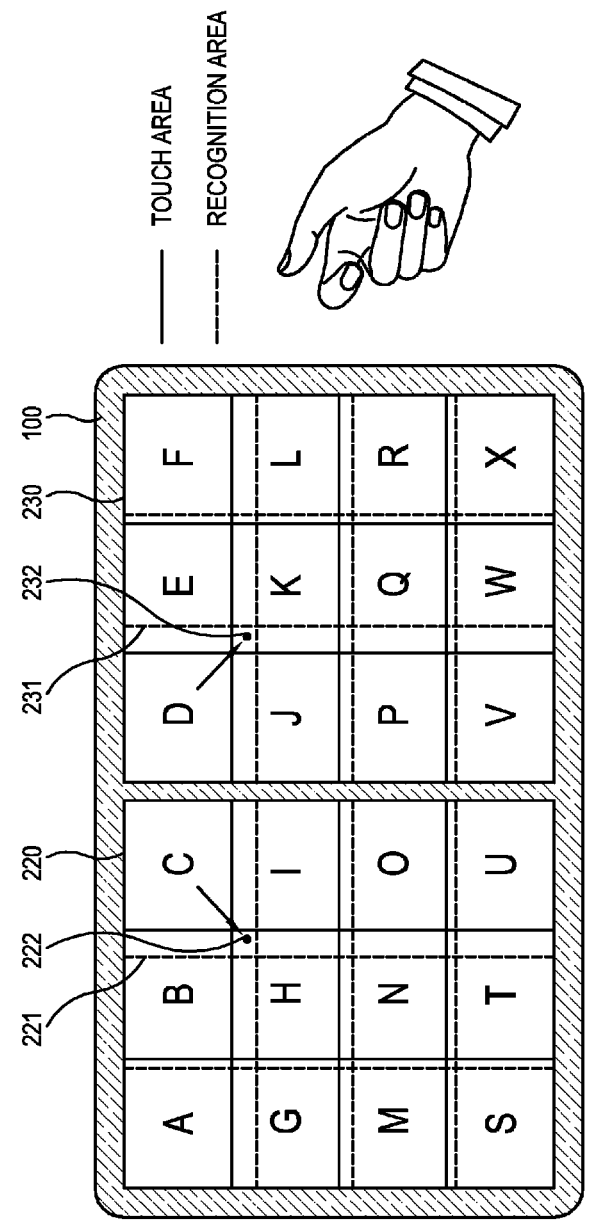

As shown in FIGS. 2A and 2B, the touch panel 120 may include a touch area and a recognition area.

The touch area receives a user's touch. The touch area may display thereon a plurality of keys and a user may input a command by the user's touch through the plurality of keys displayed on the touch area. The user's touch may include, for example, a touch, drag and push.

The recognition area recognizes a user's touch that is input to the touch area, the recognition area corresponding to such touch area.

The controller 130 may change and assign a range, size of divided portions, shape of divided portions, or combination thereof, of the recognition area corresponding to the touch area according to a predetermined standard.

According to the exemplary embodiment, the controller 130 may divide the recognition area into a plurality of cell areas, and change and assign the range of the recognition area corresponding to the touch area by a cell coordinate system in which at least a part of cell areas is nonuniformly divided.

That is, the controller 130 may divide the recognition area into a plurality of cells that correspond to cells or buttons of the touch area, and that are differently sized and/or shaped relative to one another and relative to the respective cells of the touch area.

The predetermined standard may vary.

The predetermined standard may include a location in the touch area. For example, depending on whether the touch area is far from the location of an axis gripping the touch area or close to the above location, the controller 130 may change and assign the range of the recognition area corresponding to the touch area.

The predetermined standard may include a type of the touch area. For example, depending on whether a plurality of keys of the touch area includes curved input buttons or flat touch buttons, the controller 130 may change and assign the range of the recognition area corresponding to the touch area. Also, depending on a size of the touch area, e.g., depending on whether the touch area includes a full touch screen that is provided in an external front surface of the input device 100 or includes a touch pad that is provided in an external side, the controller 130 may change and assign the range of the recognition area corresponding to the touch area.

The predetermined standard may include a touching pattern. For example, depending on a single touch or a multi touch, the controller 130 may change and assign the range of the recognition area corresponding to the touch area.

The predetermined standard may include a touching speed. For example, depending on a quick or slow touching speed, the controller 130 may change and assign the range of the recognition area corresponding to the touch area.

The predetermined standard may include a user's characteristic. For example, a movement radius of a user's finger may vary depending on the user's gripping habit, age, gender and body size, and a controller 130 may change and assign the range of the recognition area corresponding to the touch area by reflecting such characteristic. The user's characteristic may be input in advance and reflected when the range of the recognition area is assigned.

The predetermined standard may include a touching medium. For example, depending on whether the touching medium includes a user's finger or an input pen, the controller 130 may change and assign the range of the recognition area corresponding to the touch area.

The predetermined standard may include a function of the input device 100. For example, depending on whether the input device 100 performs an information input function or a drawing function, the controller 130 may change and assign the range of the recognition area corresponding to the touch area.

FIGS. 2A and 2B illustrate examples of the touch area and the recognition area that are dynamically assigned according to the exemplary embodiment.

Touch areas (display areas) 210, 220 and 230 are physical areas that are displayed. Accordingly, the touch areas 210, 220 and 230 are visibly expressed to the user and a user may input a touch based on the touch areas 210, 220 and 230. Referring to FIGS. 2A and 2B, areas expressed in solid lines are the touch areas 210, 220 and 230. The touch area 210 displays thereon a plurality of keys 1 to 0, and the touch areas 220, 230 display thereon a plurality of keys A to X.

Recognition areas (input areas) 211, 221 and 231 are logical areas. That is, the recognition areas 211, 221 and 231 are virtual areas and not visibly expressed. Referring to FIGS. 2A and 2B, areas expressed in dotted lines are the recognition areas 211, 221 and 231. A user's touch input to the recognition areas 2211, 221, 231 are recognized as corresponding to the touch areas 210, 220 and 230.

In general, when a user uses a finger, such as a thumb for example, to input a touch to a display screen, the finger rotates about an axis that is perpendicular to the display screen and located at a base of the finger. During this movement, there is a convenient movement radius in which the user can more easily move the finger relative to outside of this convenient movement radius. For example, the convenient movement radius may be a certain range of distance from the axis about which the finger moves. If a user's finger touches an area outside of the convenient movement radius, coordinates that are closer to the convenient movement radius are detected.

That is in general, if a user's finger touches a location that is far from the axis about which the finger rotates, coordinates that are closer to the axis are physically touched by the user rather than the coordinates that are actually intended by a user. Accordingly, the range of the recognition areas 211, 221 and 231 may be dynamically assigned to correspond to the touch areas 210, 220 and 230.

FIG. 2A illustrates a single touch. In FIG. 2A, it is assumed that a user touches the touch area 210 on the input device 100 by using the user's right hand. If a touch point is far from a user's right hand, coordinates which are closer to a user's right hand are physically touched instead of the coordinates actually intended by a user. Accordingly, the recognition area 211 which corresponds to the touch area 210 is more inclined or shifted to the right side than the touch area 210 in a transverse direction, and more inclined or shifted downwards than the touch area 210 in a vertical direction. That is, the borderlines of the cells of the recognition area 211 are shifted toward the axis about which the finger moves, e.g., the bottom right corner of the touch area 210, relative to the displayed cells of the touch area. Further, the farther the touch point is from a user's right hand, the more inclined or shifted the recognition area 211 is. That is, the borderlines of cells which are farther away from the axis about which the finger moves, are shifted more than the borderlines of cells that are closer to the axis.

As shown in FIG. 2A, if a user touches a point 215 of the touch area 210, it is understood that the user physically touches a number 5 key displayed thereon. However, the point 215 is included in a portion of the recognition area 211 corresponding to the number 1 key. Therefore, the input device 100 recognizes as if a user has input the number 1 key.

FIG. 2B illustrates a multi touch. In FIG. 2B, it is assumed that there are two touch areas 220 and 230, i.e., a first touch area 220 and a second touch area 230 in the input device 100 and a user touches the first and second touch areas 220 and 230 by using both hands.

Generally, a user touches the first touch area 220 with the user's left hand and touches the second touch area 230 with the user's right hand for convenience. In this case, if a touch point is far from a user's hand, i.e., far from an axis about which the finger rotates, a coordinate that is closer to a user's hand is physically touched instead of the coordinate intended by a user. For example, in the case of the first touch area 220, if a touch point is far from a user's left hand, a coordinate that is closer to a user's left hand than a coordinate intended by a user is physically touched.

Accordingly, the recognition area 221 is shifted to the left side relative to the first touch area 220 in a transverse direction, and shifted downwards relative to the first touch area 220 in a vertical direction. Further, the farther the touch point is from a user's left hand, the more shifted the recognition area 211 is. The second touch area 230 is assigned a range of the recognition area 231 corresponding to the touch area 230 similarly to that shown in FIG. 2A.

As shown in FIG. 2B, if a user touches a point 222 of the first touch area 220, it is understood that the user physically touches an alphabet H key displayed thereon. However, the point 222 is included in a portion of the recognition area 221 corresponding to an alphabet C key. Therefore, the input device 100 recognizes as if a user has input the alphabet C key despite the fact that the user physically touched the displayed H key. If a user touches a point 232 of the second touch area 230, it is understood that the user physically touches an alphabet K key displayed thereon. However, the point 232 is included in a portion of the recognition area 231 corresponding to an alphabet D key. Therefore, the input device 100 recognizes as if a user has input the alphabet D key despite the fact that the user physically touched the displayed K key.

As described above, if the range of the recognition area corresponding to the touch area is dynamically assigned, distortion which is caused by a user's movement, regardless of a user's intention, may be adjusted and a user may input as intended.

Figure 3A:
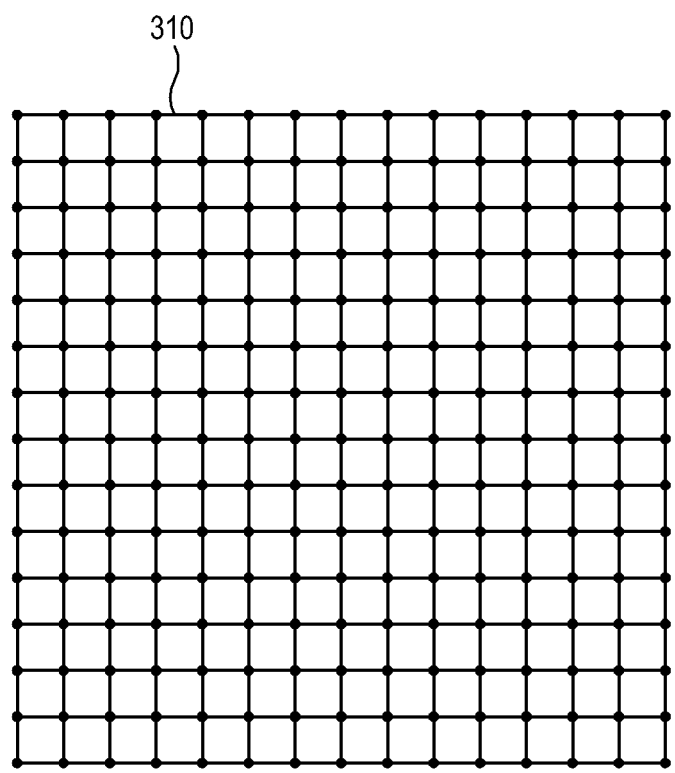
FIG. 3A illustrates a general cell coordinate system and FIG. 3B illustrates a cell coordinate system according to the exemplary embodiment.
Figure 3B:
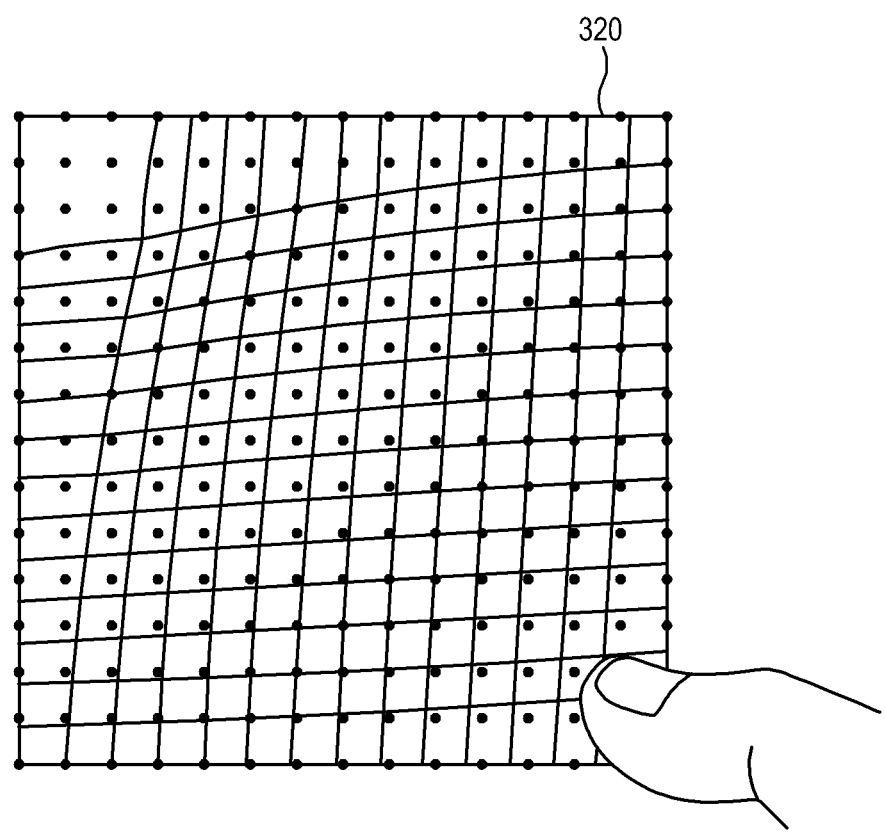

FIG. 3A illustrates a general cell coordinate system, and FIG. 3B illustrates a cell coordinate system according to the exemplary embodiment.

The cell coordinate system divides the recognition area into a plurality of cell areas and each cell area may have a coordinate set. Referring to FIG. 3A, 14×14 cells which are divided by a cell coordinate system 310 are provided, and coordinates (X, Y) may be set according to rows and columns in which each cell is located. For example, on the basis of the top left side, coordinates of a cell area located in a first column of a first row are (1,1). In this case, upon touching any part of the cell area set as the coordinates (1, 1) by a user, the input device 100 recognizes as if the cell area of the corresponding coordinates is touched.

As shown in FIG. 3A, the general cell coordinate system 310 uniformly divides a plurality of cell areas. If the touch area is divided by such cell coordinate system 310, the input device 100 recognizes a user's touch point as is on the touch area because the recognition area is the same as the touch area.

As shown in FIG. 3B, the cell coordinate system 320 according to the exemplary embodiment nonuniformly divides at least a part of cell areas. In this case, the at least a part of cell areas is nonuniformly divided by based on the convenient movement radius according to a user's movement. In this exemplary embodiment, the convenient movement radius is a certain range of distance from the axis about which the user's finger rotates. That is, the borderlines of the cells of the recognition area are skewed toward the certain range of distance from the bottom right corner of the touch area. If the touch area is divided by such cell coordinate system 320, the input device 100 recognizes the touch point that is adjusted to meet a user's intention.

FIGS. 4A to 4D illustrate various examples of the cell coordinate system according to the exemplary embodiment.

Cell coordinate systems 410, 420, 430 and 440 according to the exemplary embodiment may vary depending on a location in a gripping area, a type of the touch pad and a gripping method.

If there is a difference between the touch pad and a movement radius of a user's finger due to the type of the touch pad, a user may feel inconvenienced and a touch point may be distorted. In order to prevent the touch point from being distorted, the cell coordinate system may be generated by reflecting the type of the touch pad.

Figure 4A:
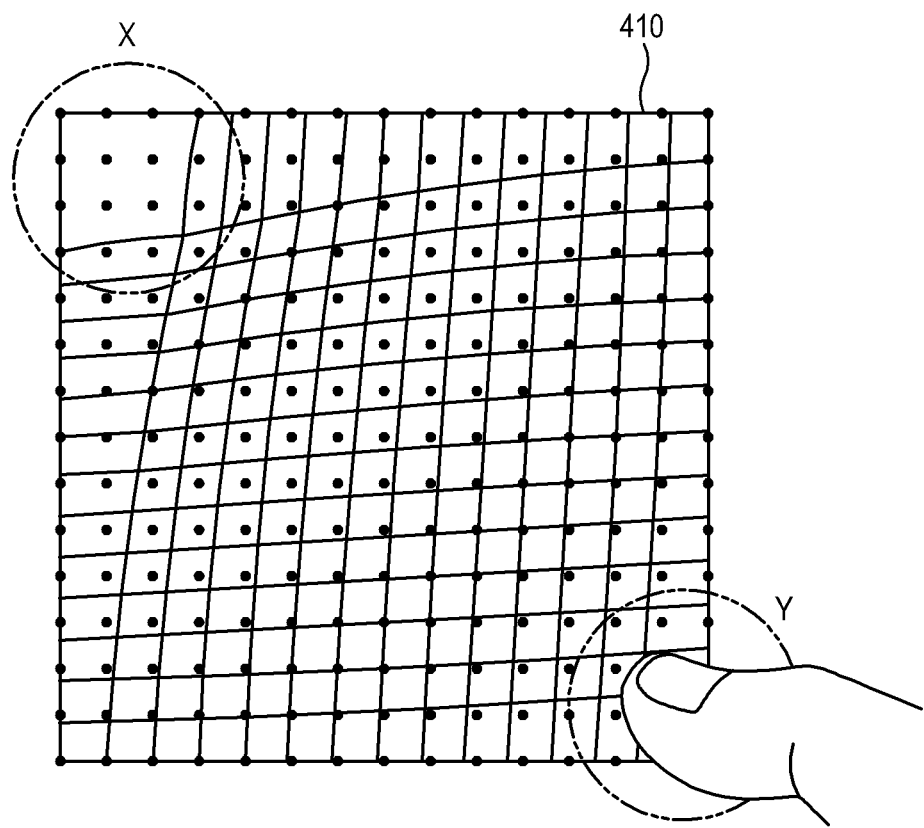
FIGS. 4A to 4D illustrate various examples of the cell coordinate system according to the exemplary embodiment.
Figure 4B:
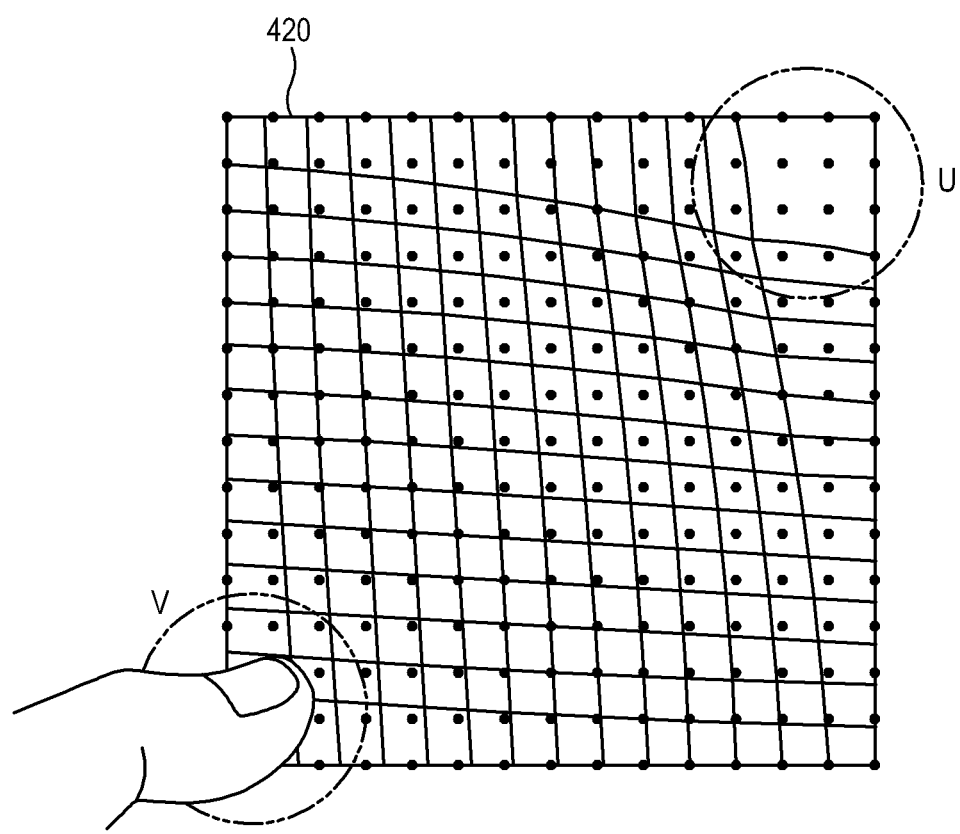

In FIGS. 4A and 4B, cell coordinate systems 410 and 420 are generated according to a location in a gripping area. Generally, any area which is outside of the convenient movement radius of the input device 100, i.e., is outside of the certain range of distance from the bottom right corner, which is conveniently reachable by a finger of the user's right hand, tends to have coordinates closer to the convenient movement radius than the intended coordinates. In FIG. 4A, a top left area (area X) which is diagonally farthest from a user's right finger and a bottom right area (area Y) which is located behind a user's right finger, close to the axis about the finger rotates, are not areas within the convenient movement radius. A central area is an area within a relatively convenient movement radius.

To reflect the foregoing, the plurality of cell areas is divided so as to move the cell areas included in the areas X and Y in a central direction, i.e., toward the convenient movement radius, and to detect the coordinates closer to the convenient movement radius than the actual coordinates that are touched by the user. For example, the plurality of cell areas is divided so as to enlarge the cell areas included in the areas X and Y. Therefore, if the user touches an area that is outside of the convenient movement radius of the input device 100, a larger area is recognized as corresponding to the touch area.

In FIG. 4B, a top right area (area U) which is diagonally farthest from a user's left finger and a bottom left area (area V) which is located behind a user's left finger are not areas within the convenient movement radius. A central area is an area within the convenient movement radius.

To reflect the foregoing, the plurality of cell areas is divided so as to move the cell areas included in the areas U and V in a central direction i.e., toward the convenient movement radius, and to detect the coordinates closer to the convenient movement radius than the actual coordinates that are touched by the user. For example, the plurality of cell areas is divided to enlarge the cell areas included in the areas U and V. Therefore, if a user touches an area that is outside of the convenient movement radius of the input device 100, a larger area is recognized as corresponding to the touch area.

Figure 4C:
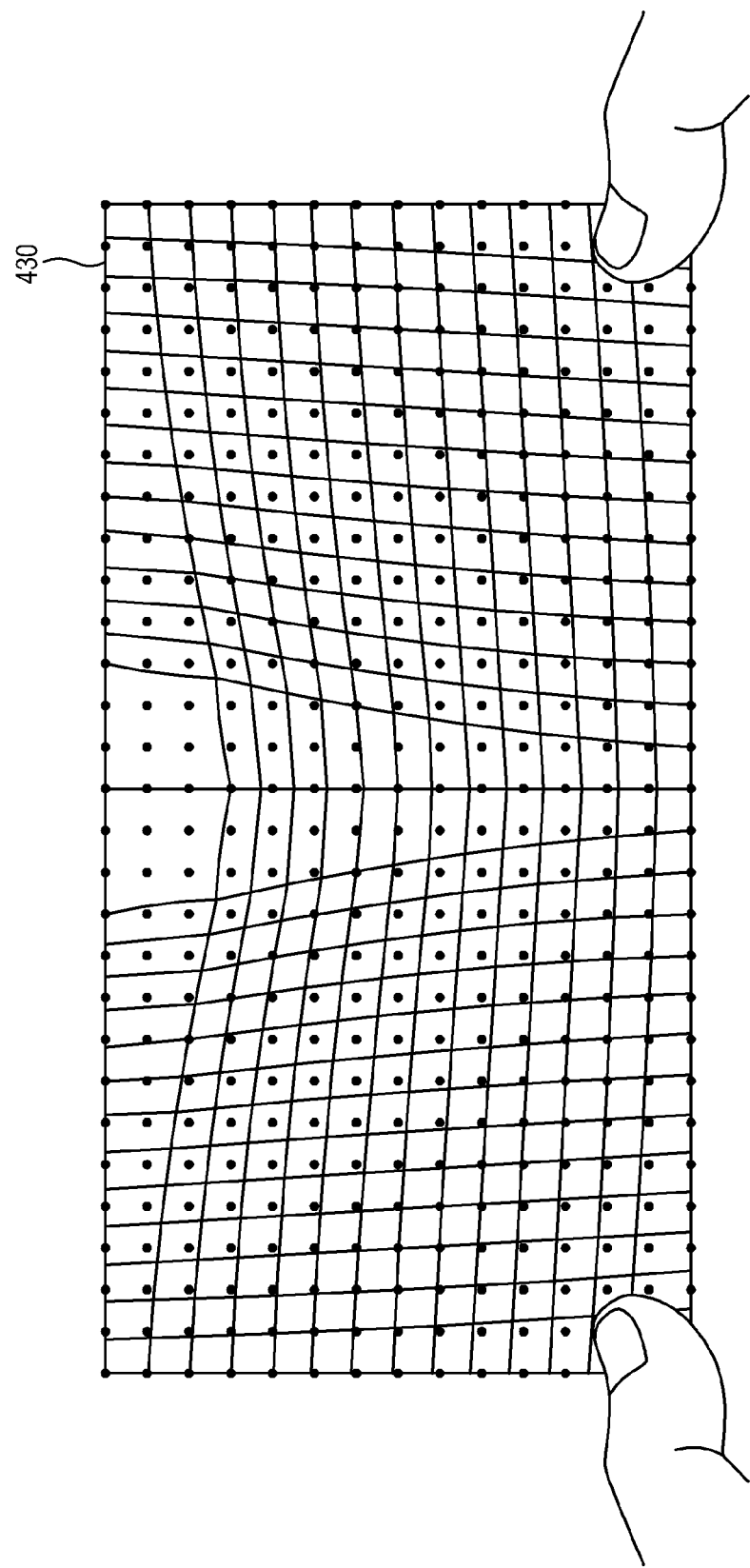

In FIG. 4C, the cell coordinate system 430 is generated by a touching pattern.

In the case of a multi touch pad, the user uses both hands on the touch screen, and therefore a moving radius of each finger may influence the other. Accordingly, such influence may be reflected in the cell coordinate system 430 unlike a single touch. Cell areas which correspond to both hands are divided as described above with reference to FIGS. 4A and 4B, and detailed description thereof will be omitted.

Figure 4D:
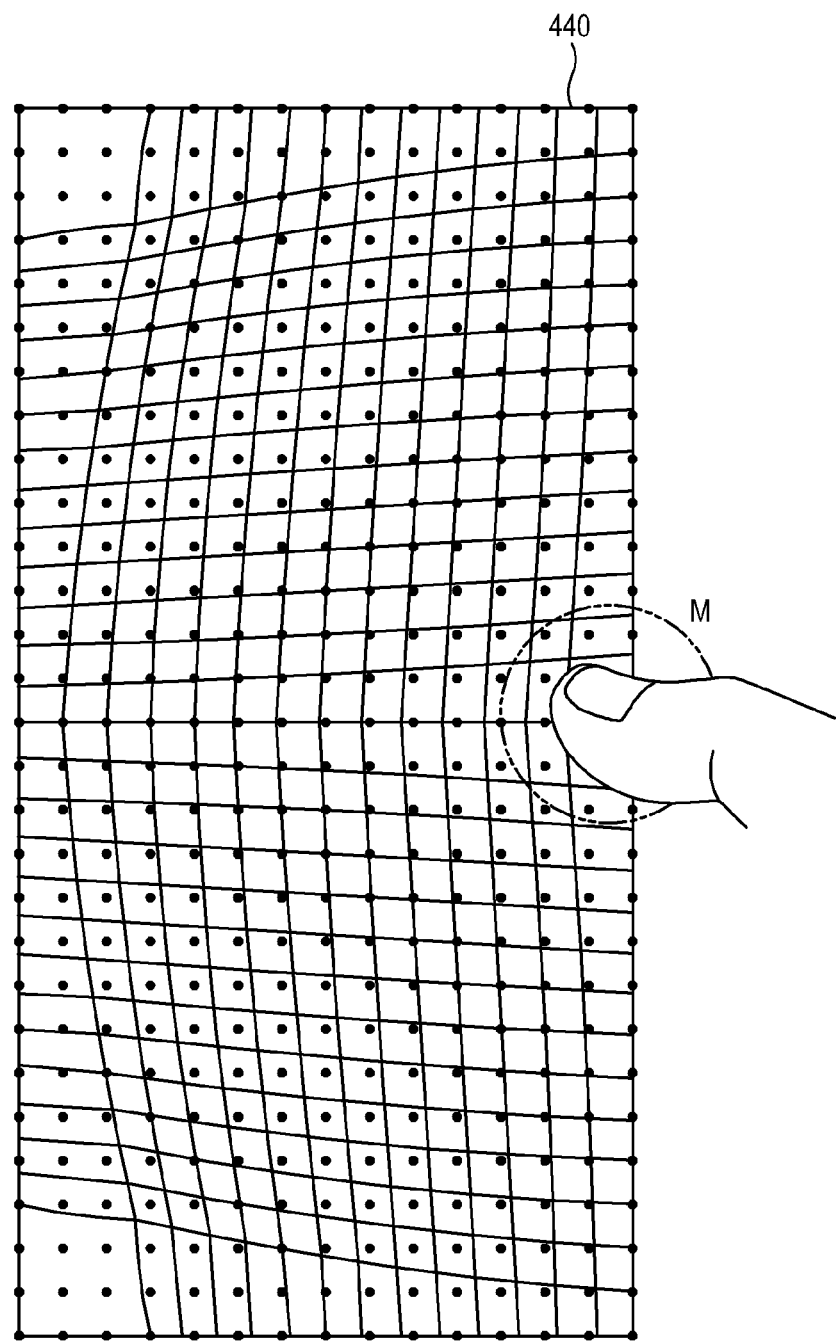

In FIG. 4D, the cell coordinate system 440 is generated by a type of a touch pad.

A user's gripping type may vary depending on whether a touch area of the touch pad is arranged vertically (FIG. 4D) or transversely (FIG. 4C). If it is assumed that a user inputs with the user's right hand, the user generally rotates a finger using a central right area (area M) as an axis. Accordingly, the plurality of cell areas may be divided to enlarge the cell areas which are farther from the area M.

Figure 5:
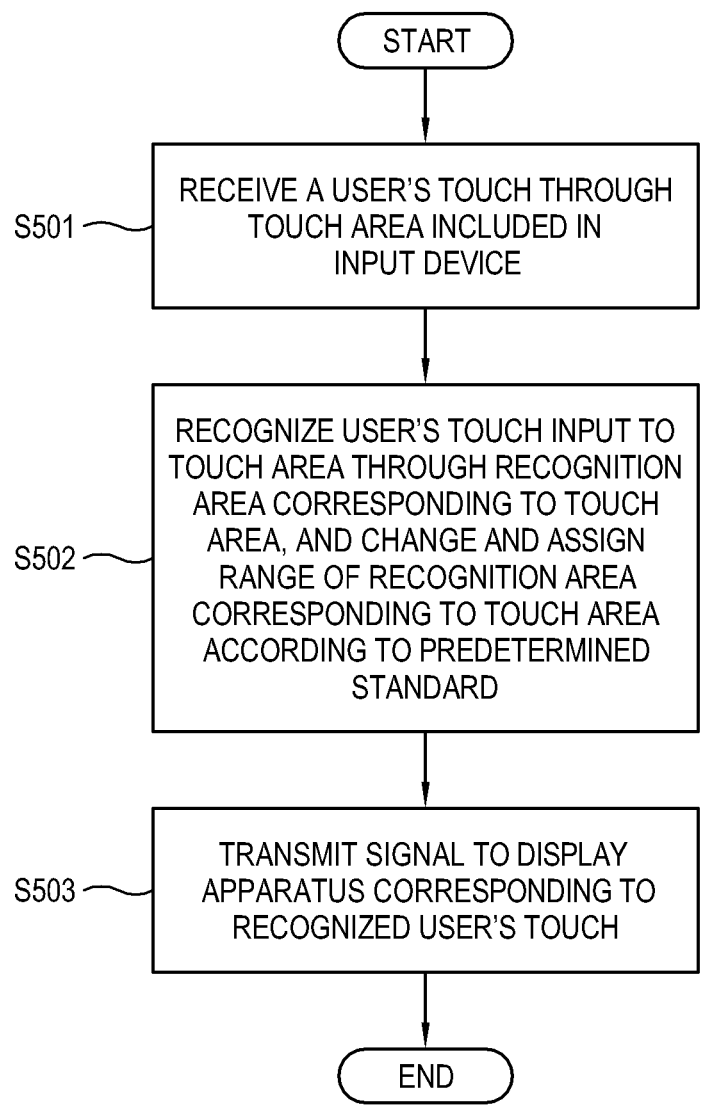
FIG. 5 is a flowchart of a control process of the input device according to the exemplary embodiment.

FIG. 5 is a control flowchart of a control process of the input device 100 according to the exemplary embodiment.

The input device 100 receives a user's input by touch through the touch area included in the input device 100 (S501).

The input device 100 recognizes the user's touch input to the touch area through the recognition area corresponding to the touch area, and changes and assigns the range of the recognition area corresponding to the touch area according to the predetermined standard (S502).

The input device 100 transmits a control signal to the display apparatus 600 corresponding to the recognized user's touch (S503). In this case, the display apparatus 600 may perform a predetermined control operation based on the control signal received from the input device 100.

The description made with reference to FIGS. 1 to 5 may be realized not by the input device 100 but by the display apparatus 600. This will be described with reference to FIGS. 6 and 7.

Figure 6:
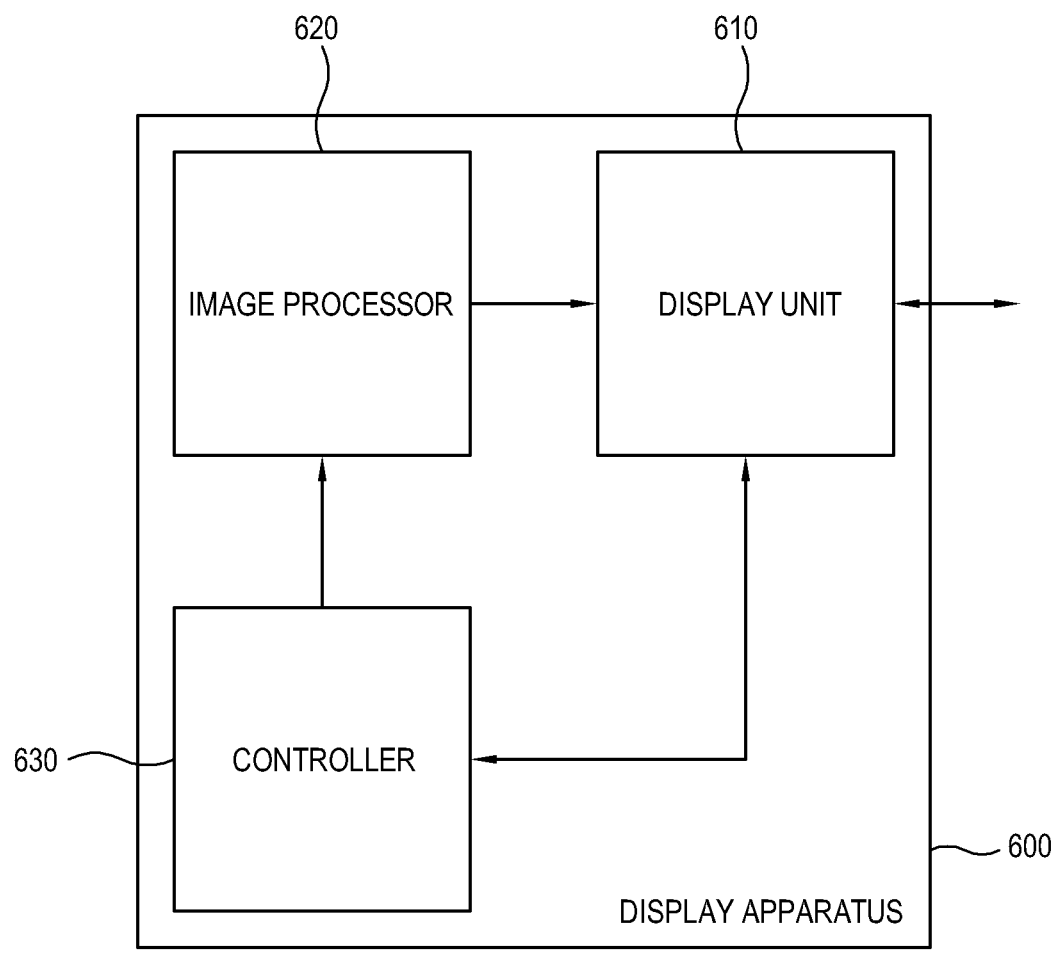
FIG. 6 is a block diagram of a display apparatus according to the exemplary embodiment.

FIG. 6 is a block diagram of the display apparatus 600 according to the exemplary embodiment.

The display apparatus 600 according to the exemplary embodiment may include a large format display (LFD), a digital TV, a mobile terminal, a laptop computer or a desktop computer. The display apparatus 600 may further include, for example, any electronic device as long as it includes a plurality of keys and controls the display apparatus 600 corresponding to a user's input through the plurality of keys.

The display apparatus 600 according to the exemplary embodiment may include a display unit 610, an image processor 620 and a controller 630.

The display unit 610 may include a touch area to receive a user's touch and a recognition area to recognize the user's touch input to the touch area corresponding to the touch area.

The image processor 620 may process an image and display such processed image on the display unit 610. To do the foregoing, the image processor 620 may perform at least one of decoding, scaling, and brightness and contrast-adjusting operations, and image enhancing operation.

The controller 630 may change and assign the range of the recognition area corresponding to the touch area according to the predetermined standard.

The controller 630 may recognize a user's touch and control the image processor 620 to process the image corresponding to the user's touch.

FIG. 7 is a control flowchart of a control process of the display apparatus 600 according to the exemplary embodiment.

The display apparatus 600 receives a user's input by touch through the touch area that is included in the display apparatus 600 (S701).

The display apparatus 600 recognizes the user's touch input to the touch area through the recognition area corresponding to the touch area, and changes and assigns the range of the recognition area corresponding to the touch area according to the predetermined standard (S702).

The display apparatus 600 performs a predetermined control operation corresponding to the recognized user's touch (S703).

As described above, an input device and a control device thereof according to the exemplary embodiments dynamically reassigns a recognition area according to a size and type of a touch pad, and a contact location and area of a user's hand gripping the touch pad and reduces a difference between coordinates originally intended by a user and coordinates actually contacted on the touch pad by a user's finger.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A control method of an input device, the control method comprising:

receiving a touch input of a user through a touch area of the input device;

determining a touch position on the touch area touched by the user;

correcting the determined touch position on the touch area based on a position of a user grip on the input device, so that a corrected value of touch position at a first point located a first distance from the position of the user grip is larger than a corrected value of touch position at a second point located a second distance smaller than the first distance from the position of the user grip; and dynamically reassigning a recognition area according to a size and a type of the touch area, the type of the touch area being depended on whether a plurality of keys of the touch area includes curved input buttons or flat touch buttons and the size of the touch area being depended on whether the touch area includes a full touch screen or a touch pad.

2. The control method according to claim 1, wherein the corrected touch position of the touch area is father from the position of the user grip than a real touch position.

3. An input device comprising:

a touch panel which comprises a touch area to receive a touch input of a user; and a controller which determines a touch position on the touch area touched by the user, and corrects the determined touch position on the touch area based on a position of a user grip on the input device, so that a corrected value of a touch position at a first point located a first distance from the position of the user grip is larger than a corrected value of a touch position at a second point located a second distance smaller than the first distance from the position of the user grip, wherein a recognition area is dynamically reassigned according to a size and a type of the touch area, the type of the touch area being depended on whether a plurality of keys of the touch area includes curved buttons or flat touch buttons and the size of the touch area being depended on whether the touch area includes a full touch screen or a touch pad.

4. The input device according to claim 3, wherein the corrected touch position of the touch area is farther from the position of the user grip than a real touch position.

* * * * *